(No Model.) 3 Sheets—Sheet 1.

R. LUNDELL.
ELECTRIC MOTOR OR DYNAMO ELECTRIC MACHINE.

No. 587,531. Patented Aug. 3, 1897.

WITNESSES:
C. E. Ashley
M. M. Robinson

INVENTOR:
Robert Lundell
By his Attorney
Charles J. Kintner

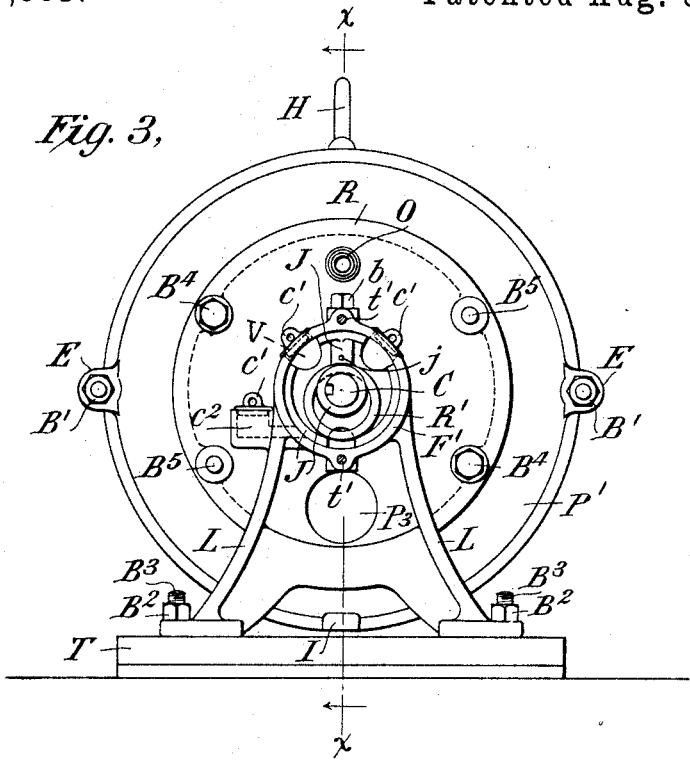
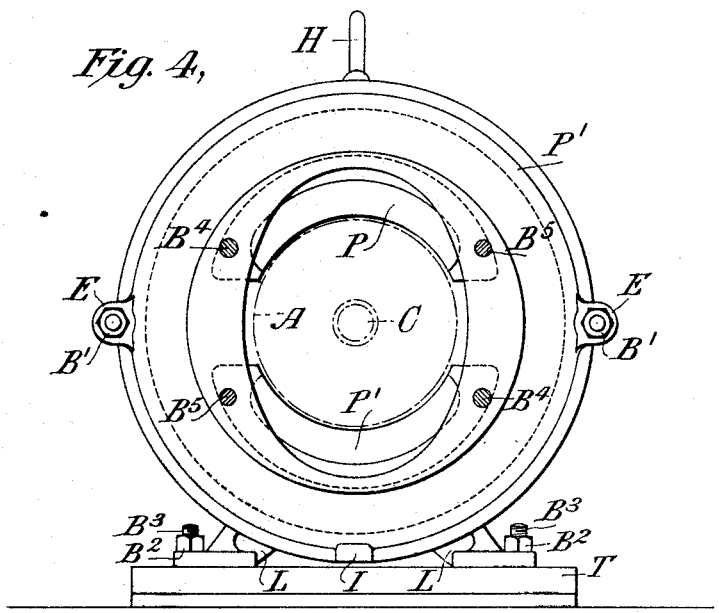

(No Model.) 3 Sheets—Sheet 3.

R. LUNDELL.
ELECTRIC MOTOR OR DYNAMO ELECTRIC MACHINE.

No. 587,531. Patented Aug. 3, 1897.

WITNESSES:
C. E. Ashley
M. M. Robinson

INVENTOR:
Robert Lundell
By his Attorney
Charles J. Kintner

UNITED STATES PATENT OFFICE.

ROBERT LUNDELL, OF BROOKLYN, NEW YORK, ASSIGNOR OF TWO-THIRDS TO THE INTERIOR CONDUIT AND INSULATION COMPANY, OF NEW YORK, N. Y.

ELECTRIC MOTOR OR DYNAMO-ELECTRIC MACHINE.

SPECIFICATION forming part of Letters Patent No. 587,531, dated August 3, 1897.

Application filed December 15, 1896. Serial No. 615,736. (No model.)

*To all whom it may concern:*

Be it known that I, ROBERT LUNDELL, a citizen of the United States, residing at Brooklyn, in the county of Kings and State of New York, have made a new and useful Invention in Electric Motors or Dynamo-Electric Machines, of which the following is a specification.

My invention is directed particularly to improvements upon an invention disclosed in a prior patent granted to me by the United States on the 30th day of August, 1892, and numbered 481,701; and its objects are, first, to so rearrange the entire structure of the motor disclosed in the aforesaid patent that the armature may be at any time removed without disturbing the field-magnet coil; second, to so construct the field-magnet cores and pole-pieces that a given pair of such cores and pole-pieces may be utilized for motors adapted to various uses, and, third, to combine such field-cores and pole-pieces, journal-bearings, and commutator-supporting devices with legs or brackets of any desired structure dependent upon the use to which the motor is to be put.

My improvement upon the aforesaid motor will be fully understood by referring to the accompanying drawings, in which—

Figure 2:
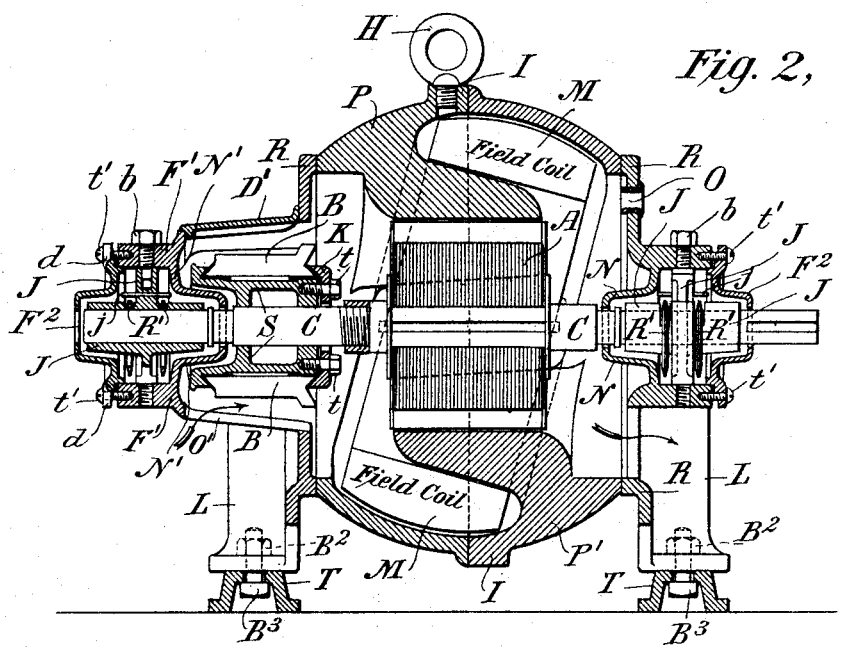
Figure 1:
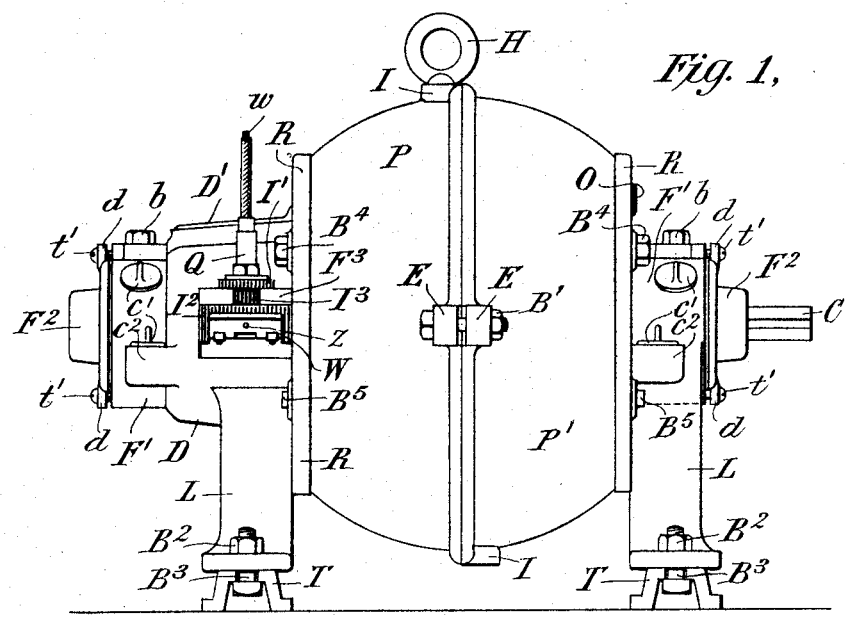
Figure 5:
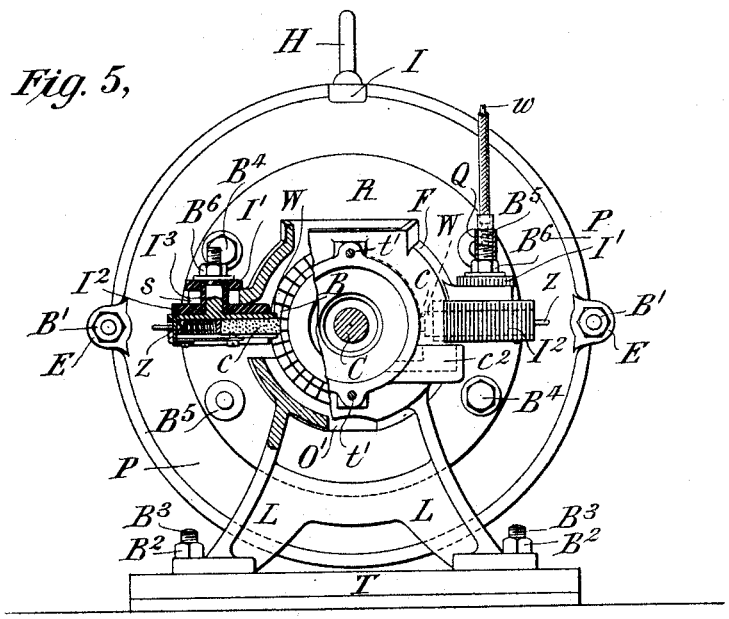
Figure 6:
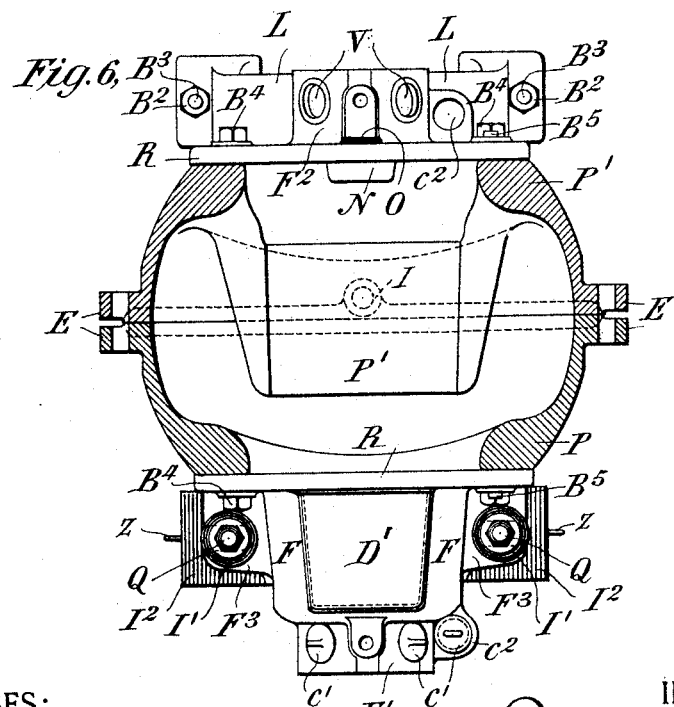

Figure 1 illustrates in side elevational view a complete motor; and Fig. 2, a longitudinal sectional view of the same, taken on the line *x x*, Fig. 3, and as seen looking from right to left in the direction of the arrows upon that figure, Fig. 3 being an end elevational view as seen looking at Fig. 2 from right to left, the cap or end plate of the oil-chamber being removed. Fig. 4 is an end elevational view as seen looking at Fig. 2 from left to right upon the supposition that the journal-bearing, the commutator, and detachable parts have been removed. Fig. 5 is an end elevational view as seen looking at Fig. 2 from left to right, one of the commutator-brushes and its means of support and the adjacent parts being shown in broken section. Fig. 6 is a horizontal sectional view taken through the body of the motor, the parts which support the ends of the field-magnet cores being shown in plan view and the field-coil, the armature, and its supporting-shaft removed therefrom.

In the motor disclosed in my prior patent above referred to the structure was such, as will be apparent on examination of Fig. 1 of the drawings thereof, that after the parts were once put together it was not possible to remove the armature without separating the field-magnet cores and removing also the field-magnet coil. This is due to the fact that the field-magnet cores were cast in semispherical form and the field-magnet coil inserted in position between said cores, the journal-bearings being integral with said cores. In the present improvement I avoid the necessity of entirely dismantling the motor when it is desired to remove the armature and its attached parts by casting the two parts of the field-magnet cores open at their outer ends and securing the journal-bearings, commutator-supports, and legs or brackets directly to the outer ends of said cores by bolts and other attachments, the cores in turn being secured together at their inner ends by bolts passing through lugs or ears, as was the case with my prior invention.

I have found that in the manufacture of small electric motors, owing to the numerous applications to which they may be put, various means of support for such motors are required dependent upon the service for which the motor is to be used, and that therefore in the structure of my former motor this fact necessitated the casting of field-magnet cores and such supports in great variety of forms in order to supply the demands of the trade, and it was largely with a view of avoiding this expense that the present invention was devised. I discovered also that when it became necessary to repair the armature, its commutator, or the journal-bearings thereof the necessity of entirely dismantling the motor disclosed in my prior patent was an objection which should be overcome. These objections are entirely overcome by the structure disclosed in the present improvement, which I will now describe by referring to the drawings in detail, in all of which like letters of reference represent like parts wherever used.

P P represent duplicate or interchangeable field-magnet cores, made, preferably, of cast magnetic steel and so formed in the casting that when put together face to face the inner pole-pieces project by or overlap each other and with a cylindrical space entirely surrounding said pole-pieces, into which fits snugly the field-magnet coil M, its axis having an angular relation to the shaft C of the armature A, as was the case in my prior invention.

E E E E are lugs or ears for receiving bolts B' B', adapted to secure the two duplicate or interchangeable parts of the field-magnet cores together.

I I are rectangular extensions at the inner ends and outer edges of the field-magnet cores, said extensions being identically alike.

The field-magnet cores P and P' are cast from a single pattern and are therefore exact duplicates and are interchangeable, the extensions I being designed for the purpose of attaching to the upper part of the motor a screw bolt or eye H, of well-known form, for handling the motor in the shop. In the outer ends of the field-magnet cores are drilled a number of holes adapted to receive bolts $B^4 B^4$ and steady-pins $B^5 B^5$ for securing thereto end plates R R or equivalent means of support, preferably of magnetic material, said end plates or means of support in the present instance being so cast that their lower extensions are in the nature of legs L L L L, provided with bolt-holes adapted to receive bolts $B^3 B^3$, secured to slitted metallic supports T T by nuts $B^2 B^2 B^2 B^2$.

The end plate R at the left hand of the drawings, as seen in Figs. 1 and 2, is cast with a conical-shaped extension D, provided at its lower side with an oblong opening O' for admitting air into the body of the motor and a rectangular opening at the top or upper side designed to receive a door or shutter D' for enabling one to inspect the commutator, said door D' being located directly over the commutator, which is keyed directly to the armature-shaft C. The commutator is supported by a cast-metal sleeve S, the commutator-strips B B being insulated from said sleeve and secured thereto by a disk K and screws $t\,t$, said strips being connected to the windings of the armature A in the usual manner.

F' is a cylindrical extension cast integral with the conical portion D and has a bolt-hole in its upper side adapted to receive a bolt for securing the journal-bearing J.

R' R' are oiling-rings resting in slits in the journal-bearing J and upon the upper surface of the shaft C and extending downward into an oil-chamber constituted by the interior cylindrical portion of the part F' and a detachable cup-shaped cap $F^2$, secured to the outer end of the part F' by lugs $d\,d$ and screws $t'\,t'$. The journal-bearing J at the pulley end of the shaft C is supported in a similar manner and in an oil-chamber cast integral with the end plate R.

$j\,j$ are pins extending through the upper flange of the journal-bearings and adapted to prevent the oiling-rings R' R' from falling out.

$c^2\,c^2$ are oiling ducts or channels adapted to admit oil to the oil-chambers at the opposite ends of the armature-shaft.

V V are peep-holes for enabling one to examine the operation of the oiling-rings R' R', and c' c' are caps for closing said ducts and peep-holes.

c c are the commutator-brushes, made, preferably, in the form of retangular carbon blocks and adapted to slide endwise against the commutator under the influence of spiral springs secured in metallic brush-guiding sleeves W W, attached to the body of the machine, but insulated therefrom by insulating material I', $I^2$, and $I^3$, $z$ being a detachable cover and support for the springs adapted to afford easy access to the brush and its attached parts.

$B^6\,B^6$ represent the binding-posts, and $w$ the conductors running thereto.

O represents a hard-rubber thimble in the end plate R, through which the field-magnet windings are carried to a starting-box, (not shown,) the circuit connections between the field-magnet coils and the commutator-brushes being arranged in the well-known manner.

It will be observed upon examination of Fig. 2 of the drawings that by reason of the oblong opening O' through the conical-shaped part D and the corresponding opening through the end plate R, which supports the pulley end of the shaft C, there is sufficient ventilation for keeping the parts of the motor cool, as is indicated by the arrows in that figure of the drawings. By reason of the arrangement of detachable end plates R R, journal-bearings J J, and legs or supports L L integral therewith I am enabled to cast these parts separate from the field-cores and with the legs L L of any desired conformation or structure—as, for instance, in the nature of brackets or supports of any peculiar conformation or form necessitated by the use to which the motor is to be put or the place wherein it is to be located. If, for instance, a motor is to be suspended from a side wall, a bracket-support would be necessary, in which event the legs L L would take bracket form without necessitating any variation or change in the expensive steel castings for the field-magnet.

I believe it is new with me to so construct the supporting end plates of an electric motor that they may constitute supports for the journal-bearings, commutator, and oiling-chambers and be integral with supporting legs or brackets of any desired form, and my claims are generic as to this feature.

Having thus described my invention, what I claim, and desire to secure by Letters Patent of the United States, is—

1. An electric motor having a rotary armature and a field-magnet composed of duplicate or interchangeable parts with overlapping field-magnet poles surrounded by an energizing-coil inclined at an angle to the axis of the armature and permitting of removal thereof without disturbing the field-magnet, substantially as described.

2. An electric motor having a rotary armature and a field-magnet composed of duplicate or interchangeable parts having overlapping poles surrounded by an energizing-coil inclined at an angle to the axis of the armature, in combination with detachable supports for the armature-shaft secured to the opposite ends of the field-magnet core, said supports being cast integral with legs or supports for sustaining the entire machine, substantially as described.

3. An electric motor having a rotary armature, a field-magnet coil surrounding the pole-pieces and the armature, and supports for the armature-shaft secured to the opposite ends of the field-magnet core, said supports being cast integral with legs or feet for sustaining the entire machine and the field-magnet being constructed of duplicate or interchangeable parts, substantially as described.

4. An electric motor having a rotary armature, a field-magnet coil surrounding the pole-pieces and the armature and having its axis inclined at an angle to the armature-shaft, said armature-shaft being supported by journal-bearings sustained in turn by detachable end plates secured to the outer ends of the field-magnet and provided with integral legs or feet for sustaining the entire machine, the field-magnet being composed of duplicate or interchangeable parts substantially as described.

In testimony whereof I have hereunto subscribed my name this 10th day of December, 1896.

ROBERT LUNDELL.

Witnesses:
C. J. KINTNER,
M. M. ROBINSON.